United States Patent
Cheung et al.

(10) Patent No.: US 7,288,860 B2
(45) Date of Patent: Oct. 30, 2007

(54) MAGNETIC TRANSDUCER WITH FERROFLUID END BEARINGS

(75) Inventors: Jeffrey T. Cheung, Thousand Oaks, CA (US); Hao Xin, Tucson, AZ (US)

(73) Assignee: Teledyne Licensing, Inc., Thousand Oaks, CA (US)

( * ) Notice: Subject to any disclaimer, the term of this patent is extended or adjusted under 35 U.S.C. 154(b) by 413 days.

(21) Appl. No.: 10/846,418

(22) Filed: May 13, 2004

(65) Prior Publication Data

US 2004/0251750 A1 Dec. 16, 2004

Related U.S. Application Data

(63) Continuation-in-part of application No. 10/077,945, filed on Feb. 19, 2002, now Pat. No. 6,768,230, and a continuation-in-part of application No. 10/078,176, filed on Feb. 19, 2002, now Pat. No. 6,812,598, and a continuation-in-part of application No. 10/078,724, filed on Feb. 19, 2002, now Pat. No. 6,812,583.

(51) Int. Cl.
 *H02K 35/02* (2006.01)
(52) U.S. Cl. .................. 310/12; 310/15; 290/1 R; 322/3
(58) Field of Classification Search ............ 310/11–15, 310/36; 290/1 R, 42, 43, 53, 54; 322/1, 322/3
See application file for complete search history.

(56) References Cited

U.S. PATENT DOCUMENTS

| | | | |
|---|---|---|---|
| 3,083,469 A | 4/1963 | Herbst | 33/366.24 |
| 3,554,617 A | 1/1971 | Weaver | 308/3 |
| 3,726,574 A | 4/1973 | Tuffias et al. | 308/36.3 |
| 3,746,407 A | 7/1973 | Stiles et al. | 308/36.3 |
| 3,834,775 A | 9/1974 | Tuffias et al. | 308/36.3 |
| 3,927,329 A * | 12/1975 | Fawcett et al. | 290/1 R |
| 3,977,739 A | 8/1976 | Moskowitz et al. | 308/187 |
| 4,064,409 A | 12/1977 | Redman | 310/306 |

(Continued)

FOREIGN PATENT DOCUMENTS

DE 3841011 A 6/1990

(Continued)

OTHER PUBLICATIONS

Patent Abstracts of Japan, vol. 013, No. 014 (M-784), Jan. 13, 1989, -& JP 63 225718 A (Hitachi Electronics Eng Co Ltd), Sep. 20, 1988 abstract.

(Continued)

*Primary Examiner*—Dang Le
(74) *Attorney, Agent, or Firm*—Koppel, Patrick, Heybl & Dawson (57) ABSTRACT

An electrical generator includes one or more magnets that move relative to one or more conductors to generate an electrical signal in each conductor. Each magnet has ferrofluid bearings in the vicinity of its opposite ends to provide a low friction interface between the magnet and a support structure. The ferrofluid bearings establish a field expansion medium that directs at least a portion of the magnetic field so that a greater portion of the field intersects the conductors than in the absence of the medium. The magnet aspect ratio is preferably on the order of unity.

21 Claims, 10 Drawing Sheets

U.S. PATENT DOCUMENTS

| | | | |
|---|---|---|---|
| 4,171,818 A | 10/1979 | Moskowitz et al. | 277/80 |
| 4,260,901 A | 4/1981 | Woodbridge | 290/42 |
| 4,356,098 A | 10/1982 | Chagnon | 252/62.51 R |
| 4,357,024 A | 11/1982 | Raj | 277/1 |
| 4,430,239 A | 2/1984 | Wyman | 252/62.51 |
| 4,485,024 A | 11/1984 | Furumura et al. | 252/62.56 |
| 4,645,960 A | 2/1987 | Hoffman | 310/90.5 |
| 4,673,997 A | 6/1987 | Gowda et al. | 360/107 |
| 4,687,596 A | 8/1987 | Borduz et al. | 252/510 |
| 4,706,498 A | 11/1987 | Nemnich et al. | 73/516 |
| 4,709,176 A | 11/1987 | Ridley et al. | 310/15 |
| 4,732,706 A | 3/1988 | Borduz et al. | 252/510 |
| 4,734,606 A | 3/1988 | Hajec | 310/90.5 |
| 4,741,418 A * | 5/1988 | Kaiser | 191/10 |
| 4,749,921 A | 6/1988 | Chitayat | 318/135 |
| 4,797,013 A | 1/1989 | Raj et al. | 384/446 |
| 4,814,654 A | 3/1989 | Gerfast | 310/154.28 |
| 4,898,480 A | 2/1990 | Raj et al. | 384/446 |
| 4,938,886 A | 7/1990 | Lindsten et al. | 252/62.51 |
| 4,965,864 A | 10/1990 | Roth et al. | 310/17 |
| 5,085,789 A | 2/1992 | Yokouchi et al. | 252/62.52 |
| 5,175,457 A | 12/1992 | Vincent | 310/15 |
| 5,323,076 A | 6/1994 | Hajec | 310/90 |
| 5,341,055 A | 8/1994 | Roche | 310/24 |
| 5,347,186 A | 9/1994 | Konotchick | 310/17 |
| 5,358,648 A | 10/1994 | Chakravarti | 252/8.6 |
| 5,376,862 A | 12/1994 | Stevens | 310/75 |
| 5,417,507 A | 5/1995 | Uno et al. | 384/107 |
| 5,444,313 A | 8/1995 | Oudet | 310/17 |
| 5,452,520 A | 9/1995 | Raj et al. | 33/366 |
| 5,471,100 A | 11/1995 | Sakamoto et al. | 310/12 |
| 5,490,425 A | 2/1996 | Raj et al. | 73/745 |
| 5,552,973 A | 9/1996 | Hsu | 362/192 |
| 5,578,877 A | 11/1996 | Tiemann | 310/15 |
| 5,587,242 A | 12/1996 | Hou et al. | 428/402 |
| 5,713,670 A | 2/1998 | Goldowsky | 384/115 |
| 5,775,169 A | 7/1998 | Solomon et al. | 74/490.01 |
| 5,780,741 A | 7/1998 | Raj | 73/514.08 |
| 5,818,132 A | 10/1998 | Konotchick | 310/17 |
| 5,851,416 A | 12/1998 | Raj et al. | 252/62.52 |
| 5,899,220 A | 5/1999 | Alcocer et al. | 137/13 |
| 5,908,987 A | 6/1999 | Raj | 73/514.09 |
| 5,950,543 A | 9/1999 | Oster | 104/138.1 |
| 6,020,664 A | 2/2000 | Liu et al. | 310/90 |
| 6,056,889 A | 5/2000 | Tsuda et al. | 252/62.52 |
| 6,083,082 A | 7/2000 | Saldana | 451/5 |
| 6,103,107 A | 8/2000 | Raj | 210/97 |
| 6,104,108 A | 8/2000 | Hazelton et al. | 310/12 |
| 6,140,730 A | 10/2000 | Tkaczyk et al. | 310/181 |
| 6,208,743 B1 | 3/2001 | Marten et al. | 381/415 |
| 6,220,719 B1 | 4/2001 | Vetorino et al. | 362/192 |
| 6,254,781 B1 | 7/2001 | Raj | 210/695 |
| 6,261,471 B1 | 7/2001 | Tsuda et al. | 252/62.52 |
| 6,277,298 B1 | 8/2001 | Borduz et al. | 252/62.52 |
| 6,313,551 B1 | 11/2001 | Hazelton | 310/12 |
| 6,501,357 B2 | 12/2002 | Petro | 335/229 |
| 6,570,273 B2 | 5/2003 | Hazelton | 310/12 |
| 6,734,574 B2 * | 5/2004 | Shin | 290/1 R |
| 2003/0155827 A1 | 8/2003 | Cheung et al. | 310/90.5 |
| 2003/0155828 A1 | 8/2003 | Cheung et al. | 310/90.5 |

FOREIGN PATENT DOCUMENTS

| | | |
|---|---|---|
| DE | 19810211 A | 9/1999 |
| DE | 2011395 U1 | 1/2002 |
| EP | 206516 A2 | 12/1986 |
| FR | 2407599 A | 5/1979 |
| GB | 1504872 A | 3/1978 |

OTHER PUBLICATIONS

Patent Abstracts of Japan, vol. 007, No. 012 (M-186), Jan. 19, 1983, -& JP 57 171117 A (Fuji Xerox KK), Oct. 21, 1982 abstract.

Patent Abstracts of Japan, vol. 002, No. 044 (M-013), Mar. 24, 1978, -&JP 53 002865 A (Inque Japax Res Inc), Jan. 12, 1978 figure 1.

Electric Motors and Motor Controls; Jeff Keljik; 1995; Delmar Publishers; pp. 139-142.

Patent Abstracts of Japan, vol. 2000, No. 14, Mar. 5, 2001 -& JP 2000 308327 A (Makino Tadashi Kenkyusho:KK), Nov. 2, 2000 abstract.

Patent Abstracts of Japan, vol. 2000, No. 26, Jul. 1, 2002 -& JP 2001 258234 A (NTT ME Kansai Corp), Sep. 21, 2001 abstract, 'Inertial Generation Equipment and Communication System', Kurokawa Naoyuki.

Calin Popa N et al: "Gravitational electrical generator on magnetic fluid cushion", Journal of Magnetism and Magnetic Materials, Elsevier Science Publishers, Amsterdam, NL, vol. 201, NR. 1-3, pp. 407-409 XP004181287, ISSN: 0304-8853, p. 408, col. 1, line 1-3; figures 1,2 Received May 25, 1998; received in revised form Sep. 21, 1998.

* cited by examiner

MAGNETIC TRANSDUCER WITH FERROFLUID END BEARINGS

RELATED APPLICATIONS

This application is a continuation-in-part of Ser. No. 10/077,945 now U.S. Pat. No. 6,768,230, Ser. No. 10/078,176 now U.S. Pat. No. 6,812,598 and Ser. No. 10/078,724 now U.S. Pat. No. 6,812,583, all filed Feb. 19, 2002.

BACKGROUND OF THE INVENTION

1. Field of the Invention

This invention relates to dynamic magnet systems, and more particularly to magnetic transducers using ferrofluid bearings at the opposite ends of the magnets.

2. Description of the Related Art

Moving a magnet through a conductive coil induces a current flow in the coil. If the magnet is moved back and forth in a reciprocating motion, the direction of current flow in the coil will be reversed for each successive traverse, yielding an AC current.

Several electrical generating systems have been disclosed that make use of reciprocating magnet movement through one or more coils. For example, in various embodiments of U.S. Pat. No. 5,347,185, one, two or three rare earth magnets are positioned to move linearly back and forth relative to one or more coils. The magnets can either be fixed and the coil moved up and down relative to the magnet, as by wave action, the coil can be fixed and the magnet moved relative to the coil as by pneumatic pressure, or the coil housing can be shaken or vibrated as by being carried by a jogger, to cause a reciprocating or oscillating motion of a magnet which moves within the coil. In one embodiment four magnets are provided in successive polar opposition, with the two end magnets fixed and the middle magnets free to move back and forth along respective portions of a tube. The two middle magnets are separated from each other by the carrier for a middle coil, the carrier being approximately twice as wide as either of the middle magnets.

In U.S. Pat. No. 4,260,901, wave motion in a body of water causes a float to move up and down, which in turn imparts a reciprocating motion to a magnet that travels between a pair of coils stationed at opposite ends of its path. In U.S. Pat. No. 5,347,186, a rare earth magnet and a coil are positioned to move linearly back and forth relative to each other. The magnet can either be fixed and the coil moved up and down relative to the magnet, as by wave action, the coil fixed and the magnet moved relative to the coil as by pneumatic pressure, or the coil housing shaken or vibrated, as by being carried by a jogger, to cause a reciprocating motion of a magnet which moves within the coil.

In U.S. Pat. No. 5,818,132, a moving magnet is confined to a bi-directional linear or near linear motion through each of at least two mutually spaced coils for providing power in applications such as long life flashlights, alarm systems, communication devices located at places where conventional electric power sources are unavailable, and relatively high power repetitive forces such as the forces on the heel of a shoe during walking or running. One embodiment discloses three moving magnets that are suspended within a vertical tube in polar opposition to each other and to end magnets, with a number of coils spaced along the outside of the tube. To minimize friction between the moving magnets and the tube, the tube is oriented vertically and moved up and down to move the magnets relative to the coils, thus generating currents in the coils. However, the vertical orientation interferes with the motion of the magnets, which have to fight gravitational forces in order to move relative to the tube. The coupling of tube movements into the magnets is thus reduced.

SUMMARY OF THE INVENTION

The present invention provides an electrical generator with improved efficiency in terms of both coupling movements of a support structure into the movement of one or more magnets constrained by the support structures, and enhancing the generation of electricity from the magnet movement.

In the accomplishment of these goals, a conductor is supported relative to a support structure such that at least a portion of the magnetic field intersects the conductor over at least a portion of the range of magnet movement. Ferrofluid bearings in the vicinity of the opposite ends of each magnet provide a low friction interface between the magnet and support structure.

In particular embodiments, the ferrofluid bearings cause the magnetic field from each magnet to extend on average further away from the magnet than if the magnet were immersed in a ferrofluid, so that a greater portion of the field intersects the conductor. Each magnet can also have an aspect ratio on the order of unity. The conductor can comprise one or more coils on the opposite side of the support structure from the magnet(s), and end magnets can be provided to limit the magnet motion by magnetic repulsion. Variations such as single magnet, multiple magnet, and multiple magnet with different characteristics are included, with multiple magnets preferably aligned in successive polar opposition to each other with respect to multiple conductors, and having multiple oscillation modes with respect to the support structure.

Output circuitry, which can include a rectifier, can be provided to couple energy out from the conductor. Operating systems that can be powered by the generator include battery chargers, environmental sensors, transmitters, flashlights and cellular telephones.

These and other features and advantages of the invention will be apparent to those skilled in the art from the following detailed description, taken together with the accompanying drawings.

DETAILED DESCRIPTION OF THE INVENTION

The present invention provides for a more effective and flexible electrical power generation than has previously been available in oscillating magnet systems. Electricity can be effectively generated from very slight movements of the magnet support structure off a horizontal plane and/or movements in a horizontal plane.

For example, a walking motion or other normal motions such as turning, tapping, bowing, or even riding in a vehicle that is subject to vibration, can easily generate useful amounts of electricity when the support structure for the magnets is held in the user's hand or in a shirt pocket, while slight off-horizontal movements due to wave or wind action can also be used for electrical generation. An almost limitless number of other actuators can be envisioned, including mounting on vehicles or machinery.

The invention employs one or more magnets that move relative to a common support structure. It is not restricted to the three magnets required for the multi-magnet system of U.S. Pat. No. 5,818,132, but rather can employ virtually any number of magnets, including even numbers. In fact, two-magnet systems can be more effective than three-magnet systems, since there is more space left for magnet movement in a two-magnet system. The requirement for a vertical orientation for the multi-magnet system of U.S. Pat. No. 5,181,132 is also eliminated, allowing for a horizontal magnet motion that is much more sensitive to movements of the support structure.

Figure 1A:
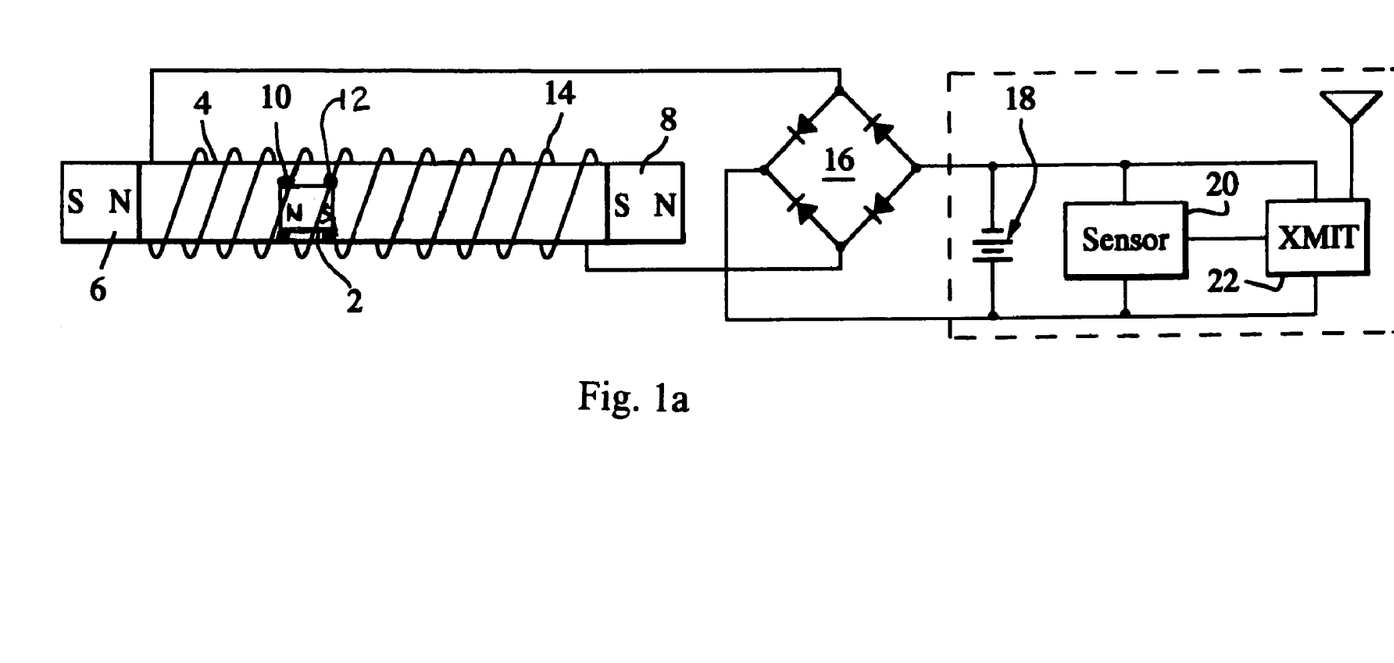
FIG. 1a is a schematic diagram illustrating the application of the invention to an environmental sensor with a single magnet generator.

FIG. 1 illustrates the application of the invention to a single magnet environmental sensor. A movable permanent magnet 2 is housed within a non-magnetic enclosure 4, with magnets 6 and 8 at opposite ends of the enclosure in axial polar opposition to central magnet 2. Thus, the ends of the moving and end magnets which face each other are of like magnetic polarity so that the kinetic energy of the moving magnet is converted to potential energy as it approaches an end magnet, and then back to kinetic energy as it is repelled away from the end magnet. A ferrofluid within the enclosure is attracted to the poles of magnet 2 to form bead-like bearings 10, 12 around the end poles of the magnet. This provides an ultra low friction lubricant that allows the magnet 2 to freely move within the enclosure, which provides a supporting structure for the magnet. The magnet will move relative to the enclosure in response to either a tilting of the enclosure away from horizontal, or a horizontal movement of the enclosure. While the "enclosure" will normally be fully closed, it can also be vented if desired.

A conductor in the form of conductive coil 14, typically copper, is wound around at least a portion of the enclosure that is traversed by the magnet 2 in its path between the end magnets 6 and 8. Movement of the magnet relative to its enclosure generates a current in coil 14, due to the magnet's moving magnetic field cutting the turns of the coil. The repulsive effect of end magnets 6 and 8 limits the travel of moving magnet 2 with a cushioning effect that prevents it from striking the hard end magnets. Since the magnetic repulsion force varies with $1/d^4$, where d is the difference between two magnets, the repulsive force increases very rapidly as the moving magnet approaches one of the end magnets. Although the coil 14 is illustrated as extending along most of the distance between end magnets 6 and 8, more typically its length would be on the order of the magnet length.

Magnet 2 and enclosure 4 both preferably have generally circular cross-sections. The dimensions of the components are preferably selected to leave a gap between the ferrofluid beads 10 and 12 and the upper enclosure wall, thereby preventing an air buildup on one side of the sliding magnet and a partial vacuum on the other side that could otherwise develop and retard the magnet's movement. Alternatively, the magnet could be perforated to allow an air flow between its opposite sides if it is desired that (together with the ferrofluid bearings) it occupy the full cross-sectional inner area of the enclosure.

A movement imparted to the enclosure 4 causes the magnet 2 to reciprocate back and forth between the end magnets 6, 8. Depending upon the particular application, the enclosure movement can be a single axial movement, reciprocating along a longitudinal axis, pivoting about a center axis, rotational, or other more complex forms of movement. As the magnet 2 moves back and forth, it generates an AC current in the coil 14. In the embodiment illustrated in FIG. 1, this current is rectified by a bridge circuit 16 and used to charge a battery 18, which provides a power source for an environmental sensor 20 that can sense one or more environmental conditions such as temperature, pressure, gases, radiation or the like. To establish the sensor at a remote location, a transmitter 22 can be provided to transmit information concerning the sensed condition, with the transmitter also operated off of battery 18. Alternately, the sensor 20 can be operated in real time, directly from the output of coil 14 or bridge circuit 16, by eliminating the battery 18.

The use of ferrofluid as an ultra-low friction lubricant between a magnetic and a non-magnetic surface has drastic advantages over traditional lubricants in the performance of an electrical power generator. Ferrofluids are homogeneous suspensions of magnetic or magnetizable ferrite nano-particles (e.g. $Fe_3O_4$ or $\gamma$-$Fe_2O_3$) in a liquid carrier. The approximately 3-15 nm diameter nano-particles are coated with "surfactant" molecules known as "ligands" to prevent them from aggregating. The surfactants assure a permanent distance between the particles to overcome the forces of attraction caused by Van der Waal forces and magnetic interaction, and also provide a chemical composition on the outer layer of the covered particles which is compatible with the liquid carrier and the chemicals in the surrounding environment. Ferrites and ferric oxides employed as nanoparticles offer a number of physical and chemical properties to the ferrofluid, including saturation magnetization, viscosity, magnetic stability and chemical stability. Several types of ferrofluids are provided by Ferrotec (USA) Corporation of Nashua, N.H. When a small amount of ferrofluid is applied to a magnet, it will be attracted toward the magnetic polar regions in a direction along the flux lines. Because of the strong magnetic attraction, the ferrofluid adheres strongly to the magnet and cannot be easily removed. As the magnet is placed on a non-magnetic surface, its weight will compress the ferrofluid cushion by a slight amount (depending on the contact area and the mass of the magnet) but still leave a liquid layer between the two surfaces. There is no solid/solid surface contact, and the amount of friction is determined by the shear strength of the liquid layer.

This mechanism makes the friction between magnet/ferrofluid/non-magnet surfaces nearly negligible, or a few orders of magnitude lower than any other conventional lubricant. The static friction coefficients and critical angles (defined as the minimum angle of inclination above which an object can start to slide downward as the frictional force is overcome by gravitation) of various materials with and without lubricant are listed in the following for comparison:

| Material | Static Friction Coefficient | Critical Angle (degrees) |
| --- | --- | --- |
| Steel | 0.6 | 30 |
| Steel/Mineral Oil | 0.14-0.2 | 10 |
| Nylon | 0.3-0.6 | 20-30 |
| Ice/Ice @ 0° C. | 0.04 | ? |
| Teflon/Teflon | 0.05 | ? |
| Ferrofluid | 0.0008 | 0.0006 |

Figure 1B:
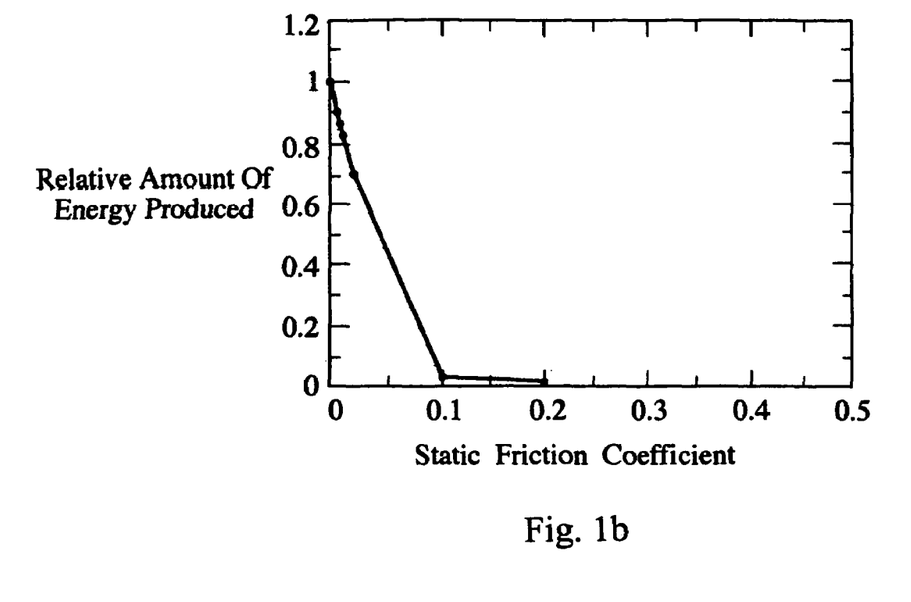
FIGS. 1b and 1c are respectively an illustrative graph of the energy produced by an oscillating magnet system as a function of the static coefficient of friction between the magnet and its support structure, and a plot of the comparative energy outputs for systems with ferrofluid and conventional lubricants.

The ferrofluid figures were obtained with an approximately 0.63 cm diameter, 1.27 cm long NdFeB magnet. The low friction and the absence of solid/solid contact with a ferrofluid have several advantages: it virtually eliminates frictional wear, and also reduces energy loss due to friction. This is best illustrated by considering a simple device with just a single magnet sliding through a coil. Having a very low friction not only improves the energy capturing efficiency, but also lowers the threshold of the initial excitation energy for the device to function. In FIG. 1b, the relative energy output for such a device placed at an inclination of 10° is calculated. This angle is smaller than the critical angle for a similar device with a bare surface magnet, with no energy captured. As the friction decreases and the critical angle becomes smaller than the angle of inclination, the capture efficiency increases. The calculation is in good agreement with measurements in the friction range below 0.01, which is achieved with ferrofluid lubricants with different viscosities. Results show that even for a friction coefficient of 0.01, the loss is only about 20%. It is important to have very low friction (<0.002) in order to reduce the loss to lower than 10%. The ferrofluid bearing described in this application is the only lubricant known to applicant that can produce this level of performance.

The performance of two devices with the same design (six segment sliding magnet stack, each segment having an approximately 2.83 cm diameter and 3.18 cm length, with 0.63 cm carbon steel spaces between segments) except one with ferrofluid lubricant and the other with 3-in-One® lubrication oil, has been measured. The devices were placed on a 26° inclination, which is greater than the critical angles for these systems. The electrical power produced during a single slide was 0.93 Watts for the device with ferrofluid lubricant and 0.20 Watts for the device with the lubricating oil.

Figure 1C:
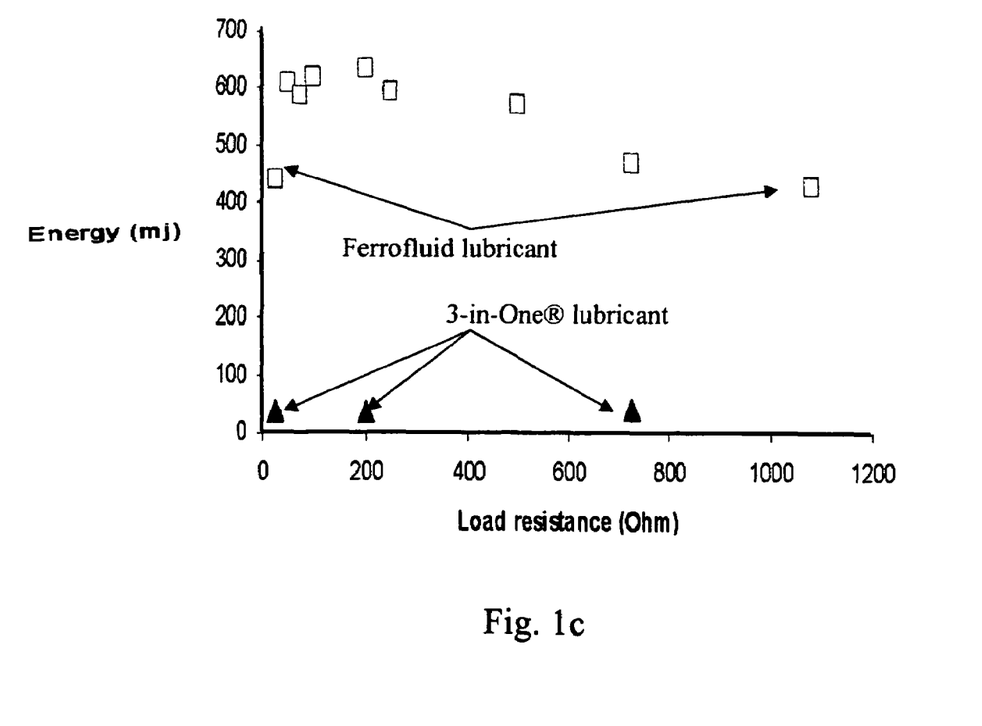

Another set of experiments was carried out to illustrate the effect of ferrofluid lubricant on the performance of a device placed in a horizontal position and subjected to pulsed excitation. The device used for measurement had the same dimension as described in the above sliding experiment to compare the performance difference between ferrofluid lubricant and 3-in-One® lubricant. In this set of experiments, the device was placed horizontally on a set of leaf springs. A pulsed excitation was applied by releasing the spring from a known displacement. The initial acceleration and total energy content of the excitation were 2.4 m/$<sec^2>$ and 1.2 Joules, respectively. The excitation was along the axial orientation of the device. Coils were connected in series and the electrical output was taken across a load resistor. FIG. 1c shows the output energy vs. load resistance for device with ferrofluid lubricant and 3-in-One® lubricant. With ferrofluid lubricant, a maximum energy captured is 640 mj and with regular lubricant only 40 mj. This is an important mode of operation, such as capturing energy associated with the horizontal motion of waves and human arm swings, etc.

In the multiple magnet embodiment discussed below, the use of multiple magnets to create random oscillatory motion enhances the sensitivity and efficiency of coupling the external motion energy into the magnet movement. In this situation, the magnets will interact and repel each other and make multiple passes across energy harvesting coils. The energy loss during each movement is cumulative. A large friction will therefore damp the sensitivity and quickly diminish the capture efficiency. To fully take advantage of the multiple magnet embodiment, an extremely low friction is even more important than in the single magnet embodiment.

Figure 2A:
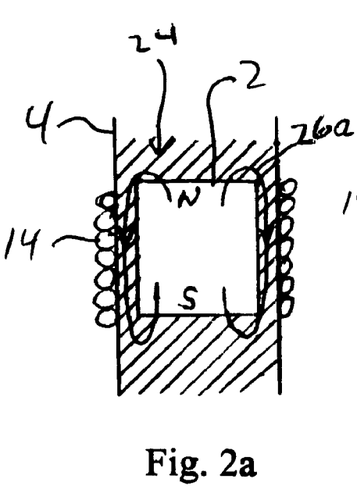
FIGS. 2a and 2b are conceptual sectional views respectively illustrating a magnet immersed in a ferrofluid, and a magnet with ferrofluid bearings at its opposite ends.

It is important to provide enough ferrofluid that bead-like bearings 10 form at the opposite ends of each magnet to provide a low friction interface between the magnet and its enclosure, but to avoid flooding the interior of the enclosure with ferrofluid. A flooded situation, such as that disclosed in Calin Popa N. et al., "Gravitational electrical generator on magnetic field cushion", Journal of Magnetism and Magnetic Materials, Vol. 201, NI. 1-3, pages 407-409, 21 Sep. 1998, is illustrated in the conceptual representation of FIG. 2a. With the magnet 2 immersed in a ferrofluid 24 (indicated by hatch lines), more of the magnetic flux (indicated by field lines 26a) tends to be captured by, and travel through, the ferrofluid inside the enclosure 4, with relatively less flux extending outside the enclosure where it can intersect the coil winding and generate an electrical signal in the coil as the magnet moves within the enclosure. This effectively reduces the electrical generating capacity of the device.

Figure 2B:
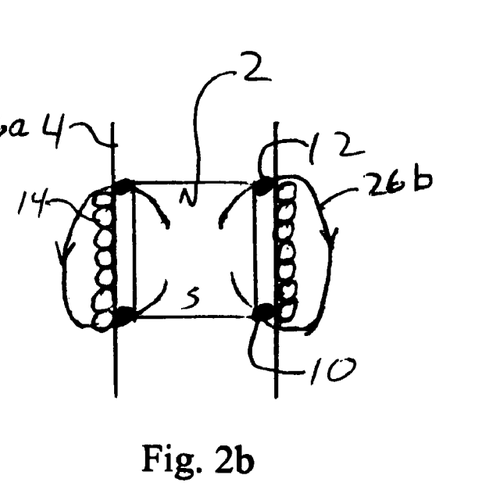

By contrast, with no more than enough ferrofluid added so that it is attracted to opposite ends of the magnet where it forms into bearings 10 and 12, as illustrated in FIG. 2b, a greater proportion of the magnetic flux extends through the enclosure wall to intersect the coil 14 as the magnet moves, as illustrated by magnetic field lines 26b of FIG. 2b. In effect the ferrofluid bearings at the opposite ends of the magnet act as field expansion media that tend to concentrate the flux in a lateral direction relative to the magnet's magnetic axis, causing a greater portion of the flux to extend further away from the magnet than would be the case in the absence of the bearings. Thus, whereas immersing the magnet in ferrofluid as in FIG. 2a holds more of the flux closer to the magnet and reduces the amount of flux that can intersect the surrounding coil, limiting the ferrofluid to an amount sufficient to form end bearings 10 and 12, but not to extend between the opposite ends of the magnet, actually increases the amount of flux that will intersect the coil, compared to both the immersed condition and to a total lack of ferrofluid.

It is also preferable, but not essential, that the magnet's aspect ratio (its length divided by its diameter) be on the order of unity. If the magnet is significantly shorter, its flux has less of an opportunity to extend outward to the coil before it is returned to the opposite pole. Rather, it will be concentrated near the magnet surface between the side of the magnet and the coil, where it cancels the effect of the magnet's internal field (as seen by the coil), and thus does not contribute to the electrical generation.

On the other hand, the coil's axial length is normally approximately equal to the magnet's length, so that the coil experiences a change in flux as the magnet moves. If the coil is shorter than the magnet the amount of electrical generation is reduced, while making it longer than the magnet does not increase its generating potential compared to a coil and magnet of equal length. This is because the total flex differential does not change as the magnet traverses the coil, although with a longer coil the magnet must travel a greater distance to achieve this flux differential. If the magnet's length is significantly longer than its diameter, the coil will normally be similarly extended. This will result in greater coil resistance and bulk, and thus greater electrical losses, without any compensating increase in generating potential.

The characteristics of the ferrofluid and magnets are related. If the magnets have a relatively low magnetic field, a ferrofluid of relatively high magnetization should be used. The magnets' magnetic fields will typically range from about 500-4000 Gauss, and the magnetization of the ferrofluid from about 50-400 Gauss.

The ferrofluid's frictional coefficient is roughly related to its viscosity (measured in centipoise (cp)), but not directly. For example, a ferrofluid with a viscosity of 300 cp has been found to have a static friction coefficient of about 0.015, the EFH1 ferrofluid from Ferrotec (USA) Corporation has a viscosity on the order of 6 cp and a static friction coefficient of about 0.002, but a water based ferrofluid with a viscosity of 5 cp has been found to have a static friction coefficient of about 0.01. The higher friction coefficient for the somewhat lower viscosity composition has been attributed to a surface tension associated with a water based solvent.

One preferred ferrofluid composition for the present invention has a viscosity substantially less than 5 cp, actually less than 2 cp, and achieves an ultra low coefficient of static friction in the range of 0.0008-0.0012. This is sensitive enough for a magnet on a beam to begin sliding when the beam is tilted only about 0.07 degrees off horizontal. The composition comprises a mixture of one part Ferrotec (USA) Corporation EFH1 light mineral oil ferrofluid mixed with from two to four parts of isoparaffinic acid, stirred for 24 hours. Suitable sources of isoparaffinic acid are Isoopar G and Isopar M hydrocarbon fluids from ExxonMobil Chemical Corp.

Undiluted EFH1 ferrofluid could also be used. Undiluted EFH1 composition has a greater weight bearing capacity than the diluted version, but diluting the composition will retain sufficient weight bearing capability for most applications. Other ferrofluids with static friction coefficients up to about 0.02 could also be used, such as Ferrotec (USA) Corporation type EMG805, a water based ferrofluid with a static friction coefficient of about 0.01 and a viscosity of about 5 cp, since the power output achievable with a 0.02 static friction coefficient is still about 75% that achievable with a zero friction system.

At present the EMG805 composition is more expensive than the EFH1 composition and has a somewhat lesser load bearing capability. In general, suitable ferrofluids will yield a critical angle of displacement from a horizontal static position of less than 1 degree to initiate magnet movement, and with the mixture described about the critical angle is less than 10 minutes.

Figure 3:
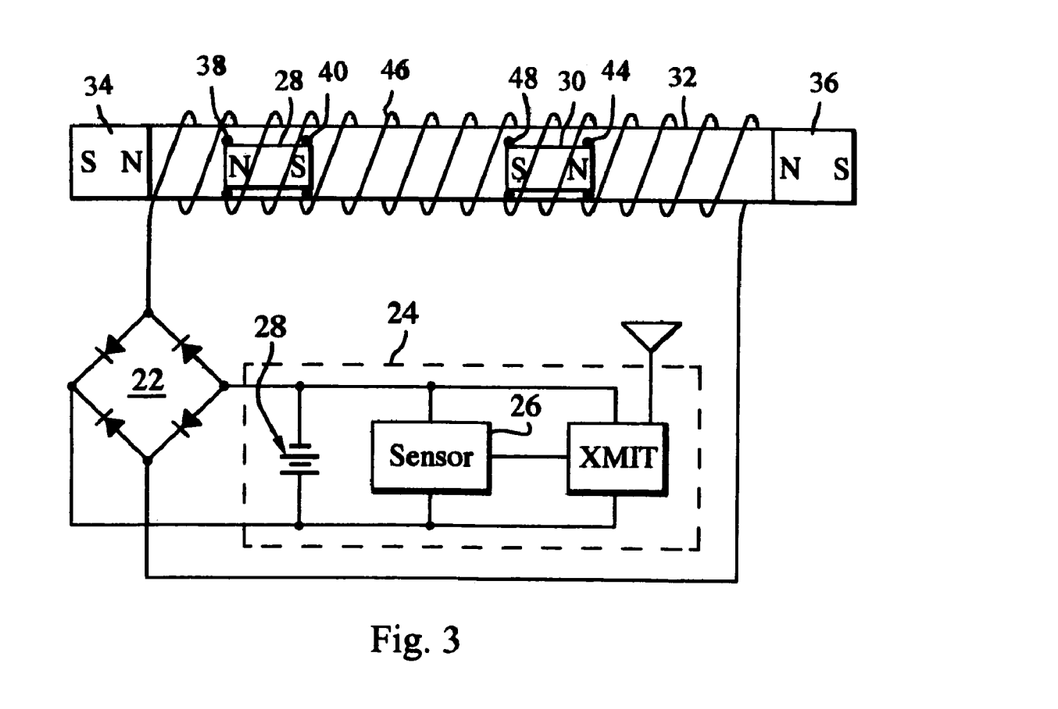
FIG. 3 is a schematic diagram illustrating the application of the invention to an emergency transmitter with a multiple magnet transducer.

FIG. 3 illustrates the application of the invention to a multi-magnet environmental sensor. In this embodiment, two moving magnets 28 and 30 move along the axis of a support structure in the form of a tubular non-magnetic enclosure 32. The magnets are in polar opposition to each other, with their facing ends of like magnetic polarity. Thus, the magnets mutually repel each other when they come into proximity. Additional fixed magnets 34 and 36 are positioned at opposite ends of the enclosure in polar opposition to their nearest respective moving magnets 28 and 30. The ends of the moving and end magnets which face each other are also of like magnetic polarity.

A ferrofluid within the enclosure 32 is naturally attracted to the poles of magnets 28 and 30 to form beaded bearings 38, 40 and 42, 44 around the end poles of magnets 28 and 30, respectively. This provides an ultra low friction lubricant that allows the magnets to freely slide with respect to the enclosure. The magnets will slide in response to a tilting of the enclosure away from horizontal, a horizontal movement of the enclosure, or more complex compound movements.

A conductive coil 46 is wound around the portion of the enclosure that is traversed by the magnets 28 and 30 in their slide paths between the end magnets 34 and 36. A movement of the enclosure that causes the magnets to slide generates a current in coil 46 due to the change in total flux across the coil.

A movement imparted to the enclosure 32 causes the magnets 28 and 30 to reciprocate or oscillate back and forth. Depending upon the particular application, the enclosure movement can be a single axial movement, reciprocating along a longitudinal axis, pivoting about a center axis, rotational, or other more complex forms of movement. As described in further detail below, the magnets have multiple modes of oscillation, making them more receptive to coupling different types of enclosure motion into the magnets than is the case with a single magnet system. This allows the system to be usefully employed with numerous different types of periodic enclosure movements, and also with random or quasi-random enclosure movements. It is shown powering the same environmental sensor and transmitter apparatus as in FIG. 1.

Figure 4:
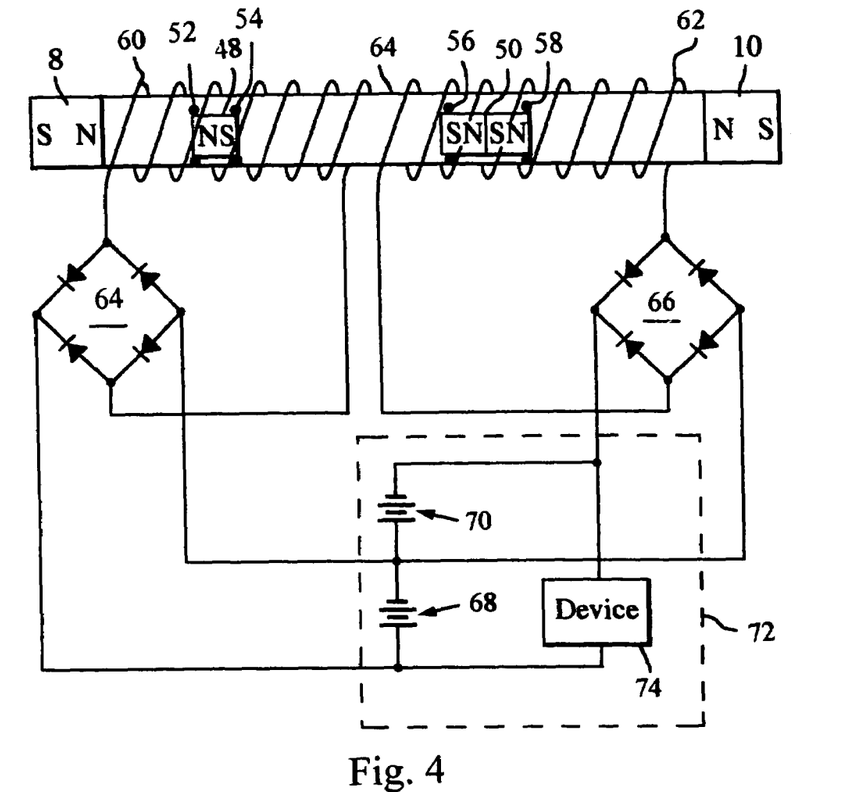
FIG. 4 is a schematic diagram illustrating a two magnet embodiment with different effective magnet sizes.
Figure 5:
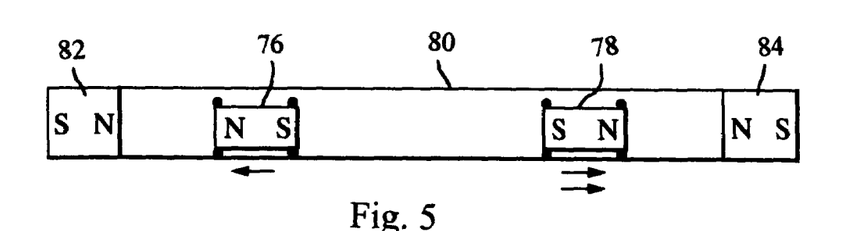
FIG. 5 is a schematic diagram of a two-magnet embodiment with equal sized magnets having different magnetic strengths.
Figure 6:
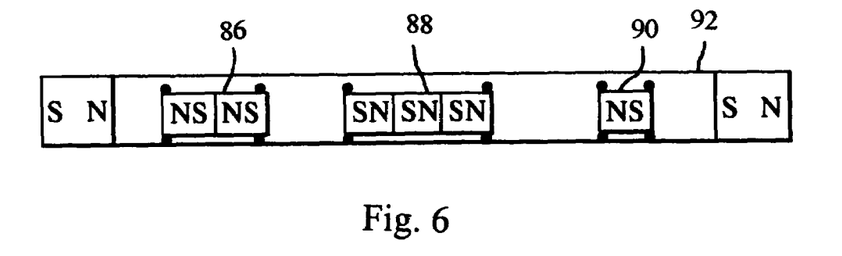
FIG. 6 is a schematic diagram of a three-magnet embodiment with different magnet effective magnet sizes and magnetic strengths.

FIGS. 4-6 illustrate different embodiments of an approach that uses multiple magnets, at least some of which have different characteristics. In FIG. 4, one magnet 48 is illustrated as having a unit size, while a second magnet 50 is illustrated as comprising two unit sizes. Since all of the magnet units are assumed in this embodiment to have equal magnetic strengths, the overall magnetic strength of magnet 50 will be twice that of magnet 48. Ferrofluid bearings 52, 54 and 56, 58 are provided at the opposite ends of magnets 48 and 50, respectively.

The use of two magnets in polar opposition to each other with ferrofluid bearings has been found to greatly increase the responsiveness of magnet motion to enclosure movements that are not at the natural frequency of the enclosure with a single magnet, and/or are out of phase with the initial magnet motion. Surprisingly, it has been discovered that, when the two magnets have different magnetic strengths, both magnets have a greater response to enclosure movements than do two equal magnets of intermediate magnetic strength. In other words, starting with two magnets of equal magnetic strength, increasing the strength of one and reducing the strength of the other will cause both magnets to oscillate faster in response to enclosure movements for particular ranges of strength ratios. This greater responsiveness directly increases the amount of power that can be generated with the system.

A pair of conductive coils 60 and 62 are wound on respective halves of the magnet enclosure 64. Alternately, a single coil encompassing the full length of magnet movement within the enclosure could be employed but, since the two magnets will often be moving in opposite directions, opposing currents would be induced in a single coil during these periods that would lower the system's overall efficiency. Again, although the coils are shown as being longer than the magnets, normally they would be closer to the length of the longer magnet.

Coils 60 and 62 are connected to respective full-wave bridge rectifying circuits 64 and 66, the outputs of which charge batteries 68 and 70, respectively, within an overall operating system 72. The batteries provide power for an operating device 74, such as an environmental sensor, transmitter, flashlight or cellular telephone, that can be operated by mechanical inputs such as a walking motion, wave motion or wind. Alternately, the bridge outputs can be connected directly to the operating device if real time power is desired.

FIG. 5 illustrates an alternate embodiment, with just the magnets and their enclosure shown for purposes of simplification, without coils or other circuitry. In this embodiment a pair of magnets 76, 78 are again retained within a nonmagnetic enclosure 80 by end magnets 82, 84 of opposing polarities. In this case the magnets are of equal size, but magnet 78 has a greater degree of magnetization and magnetic field strength, as indicated by double magnetization arrows, as opposed to a single magnetization arrow for magnet 76. The operation of this type of arrangement is generally equivalent to that shown in FIG. 4, in which each of the magnet sections have equal unit field strengths, with one magnet having two sections and the other having one. In both cases, both magnets will move faster in response to movements of the enclosure, for particular ranges of size and strength ratios, than would be the case with two magnets both having a field strength equal to the stronger magnet of FIG. 5.

FIG. 6 illustrates a further embodiment with three magnets 86, 88 and 90 within enclosure 92. In this example the magnets all have different sizes/magnetic field strengths, with each riding on ultra low friction ferrofluid bearings. The largest magnet is shown disposed between the other two, but this order could be varied, as could the ratios between the magnet sizes/field strengths, within the scope of the invention. Two of the magnets could also be made equal, with the third magnet having a different field strength. This aspect of the invention can be generalized to any plural number of magnets, with at least two having different magnetic strengths, although increasing the number of magnets reduces the effective length of the enclosure left for magnet movement.

Figure 7:
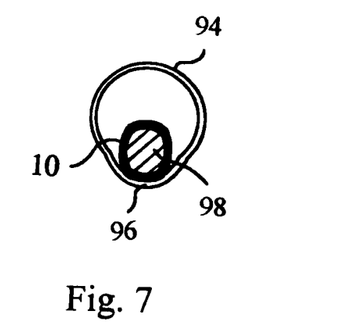
FIG. 7 is a section view of an embodiment in which a magnet slides along a raceway formed in the enclosure.

FIG. 7 illustrates one possible configuration for an enclosure 94 in which a shaped raceway 96 is provided in the wall of an otherwise circular cross-sectional enclosure, with a magnet 98 dimensioned so that it slides in the raceway and avoids lateral motion. This is useful for applications in which the enclosure experiences movements in the lateral direction, as well as in the plane of the magnet travel, helping to confine the magnet to a longitudinal movement.

The enclosure 94 which provides a support structure for the magnet preferably has a smooth, nonporous surface that does not absorb the ferrofluid. Materials such as polycarbonates and glass are suitable, while Teflon® is not desirable because it tends to absorb the ferrofluid.

Figure 8:
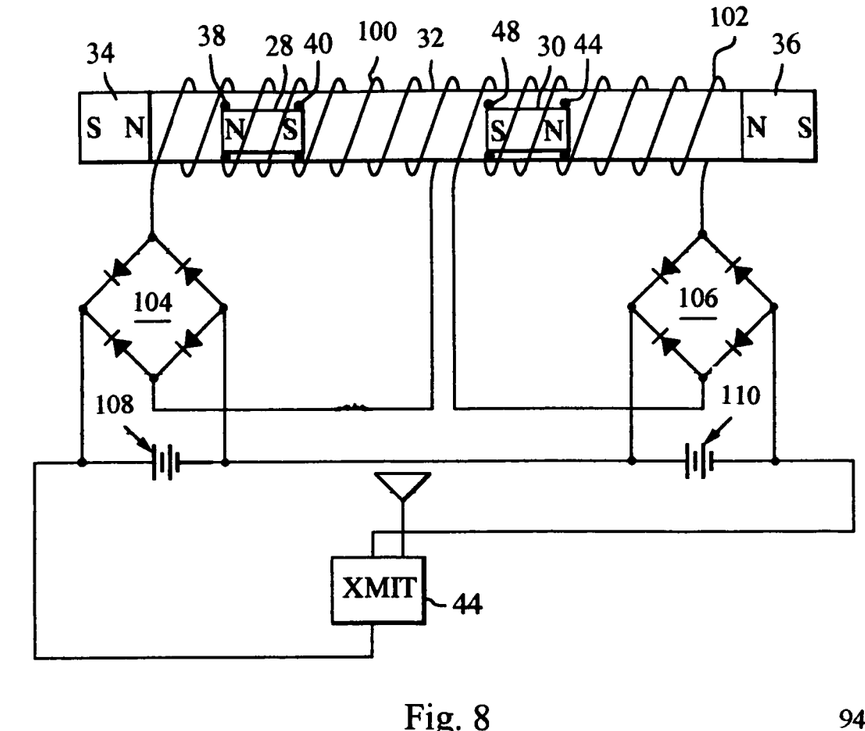
FIGS. 8 and 9 are schematic diagrams illustrating the application of the invention to emergency transmitter and flashlight applications, respectively.

The invention has many applications, a few of which are illustrated herein. The application of the multiple magnet embodiment of the invention to an emergency transmitter is illustrated in FIG. 8, with common elements indicated by the same reference numbers as in FIG. 3. In this embodiment a pair of separate coils 100 and 102 are wound on respective halves of the enclosure 32. This is more effective than the single coil embodiment of FIG. 3, since the two magnets 28, 30, illustrated as having equal lengths and magnetic strengths in contrast to the system of FIG. 4, are frequently found on opposite halves of the enclosure and often travel in opposite directions. With the single coil embodiment of FIG. 3, the magnets induce opposing currents in the coil when they are moving in opposite directions, thus reducing the overall electrical output. In the embodiment of FIG. 8, on the other hand, the use of two separate coils effectively allows the absolute current values in each coil to be accumulated, regardless of the directions in which the two magnets are moving. This is accomplished in FIG. 8 by connecting coils 100 and 102 to respective full-wave bridge rectifying circuits 104 and 106, the outputs of which charge batteries 108 and 110, respectively. The batteries can be connected in series as shown, or in parallel if desired, to provide power to an operating system that includes an emergency transmitter 112.

Figure 9:
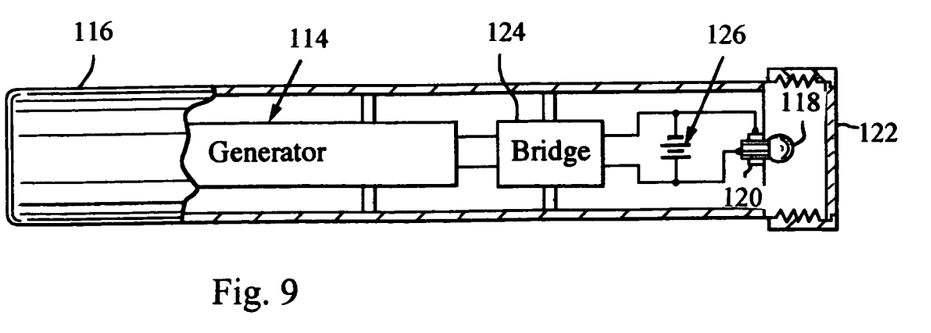

FIG. 9 illustrates the invention as applied to a hand held flashlight. An electrical generator 114 as described above is provided within a flashlight housing 116, with an illuminating bulb 118 at one end held to a bulb contact 120 and emitting light through a transparent plate 122 that can be screwed off to access the bulb. As with the other embodiments described above, the generator 114 provides an AC output that is rectified by bridge circuitry 124 which charges one or more batteries 126 connected in circuit with the bulb contact 120. Again, the battery can be eliminated if real time flashlight operation is desired.

Figure 10:
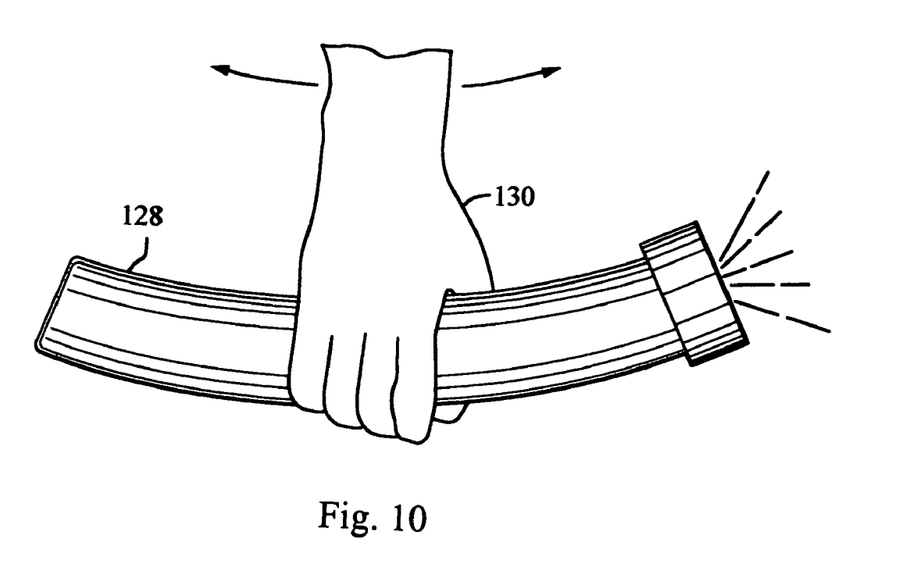
FIG. 10 is an elevation view illustrating a curved flashlight that is operated in response to the user's hand motion while walking.

FIG. 10 illustrates a variation in which the longitudinal axis of a flashlight housing 128 is curved along an arc, rather than straight; numerous other ergonometric designs could also be envisioned. The flashlight would be held in a person's hand 130, with its curvature designed to match the arc through which the person's hand swings while walking. This provides a smoother movement between the magnet and its enclosure during a normal walking movement.

Figure 11:
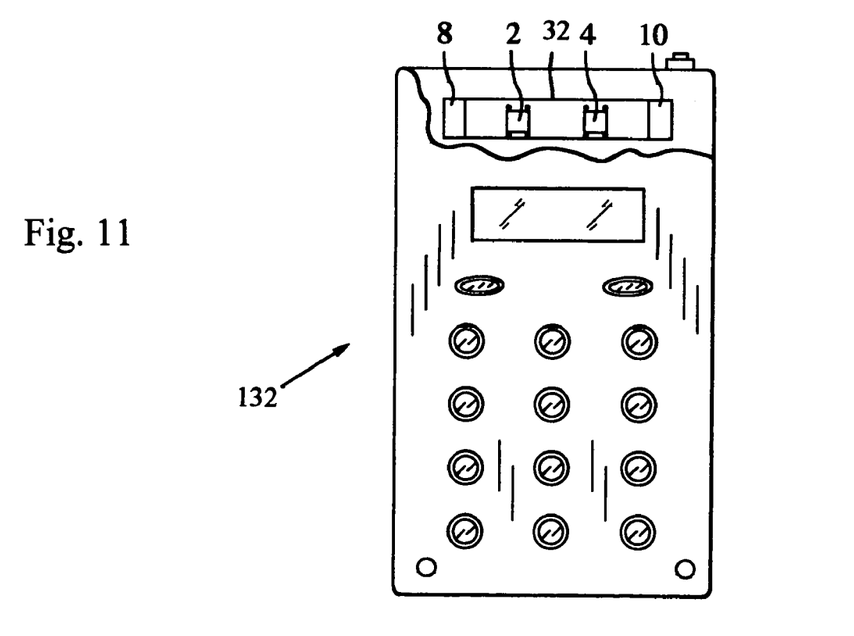
FIG. 11 is a partially broken away elevation view of a cellular telephone powered in accordance with the invention.

FIG. 11 illustrates the application of the invention to a cellular telephone 132 that can be placed in a person's shirt pocket; for purposes of simplification the coil or coils wound on the magnet enclosure 32 are not shown.

The magnet enclosure 32 is supported within the cell phone 132 so that it has a generally horizontal orientation when the phone is placed upright in the user's shirt pocket or held in a belt clip. The motion sensitivity achieved with the invention allows power outputs on the order of 0.4 watts to be readily achieved with the movement accompanying a normal walking motion, whereas a typical cell phone presently consumes an average power of about 0.2 watts. Thus, cell phones and like devices constitute an important application for the invention.

Figure 12:
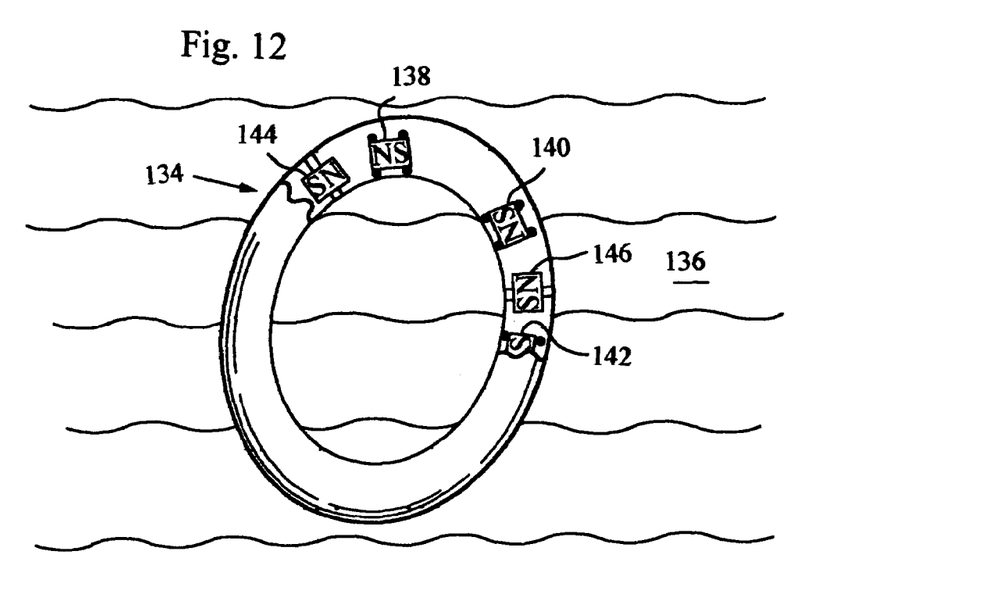
FIGS. 12 and 13 are simplified perspective views of electrical generators in accordance with the invention actuated in response to wave and air motion, respectively.

An electrical generator operated by wave action is illustrated in FIG. 12. This system is useful for powering an emergency transmitter, a repeater station for underwater cable, or other marine applications requiring an electrical power source that is not otherwise available. In the illustrated embodiment, the generator is provided in the form of a buoyant ring 134 which floats upon water 136. The ring is tubular and houses at least one, and preferably a plurality of moving magnets, of which magnets 138 and 140 and a portion of magnet 142 are visible in the partially broken away view shown. As before, the adjacent moving magnets are in polar opposition to each other, with ferrofluid bearings on the magnets providing ultra low friction contacts with the tubular enclosure. A relatively large number of moving magnets can be provided and allowed to move freely within the ring. With normal wave action, most or all of the magnets may tend to move in the same direction much of the time, allowing a single continuous coil to be provided all around the ring. However, if it is desired to associate each moving magnet primarily with a single pickup coil so that opposing directions of movement for the different magnets do not subtract from the accumulated power output, the interior of the ring could be segmented as illustrated in FIG. 12 by fixed magnets such as 144 and 146, each in polar opposition to the moving magnets on either side. Separate coils (not shown) could be wound around each half of each tube segment, making it less likely for different magnets to produce opposing currents in the same coil. Associated rectifier circuits, batteries and operating systems (not shown) could be provided, with an associated device operated by the electrical signals produced in response to magnet movement. In the illustrated embodiment the ring is segmented into four sections of two magnets each.

Figure 13:
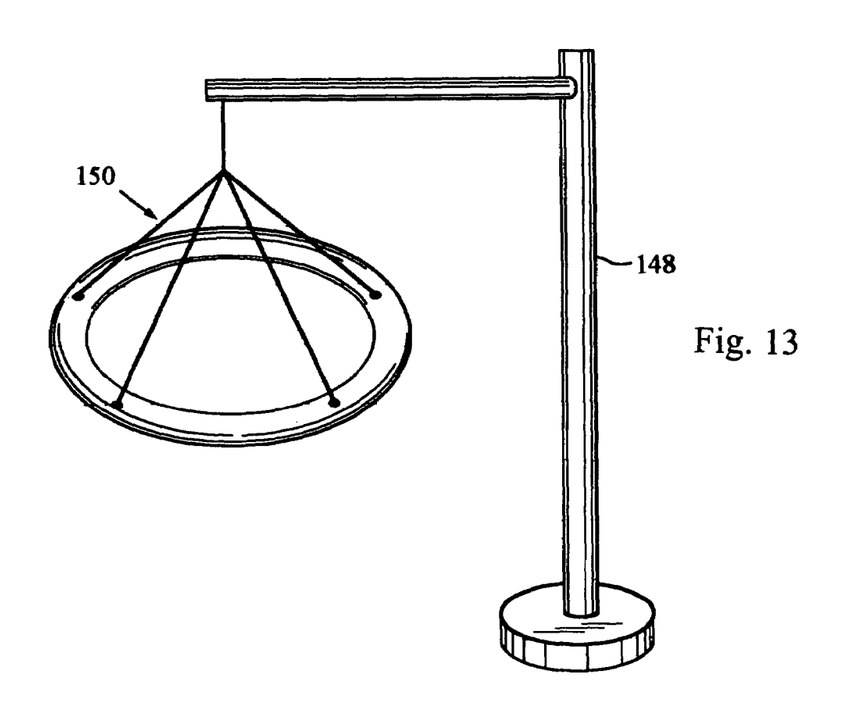

FIG. 13 illustrates a wind-powered device that is similar to the ring-shaped marine generator of FIG. 12, but is suspended in air and moved by the wind to generate electricity. A support structure 148 includes a suspension system 150 that suspends the apparatus in air, where it can be blown by the wind. Wind vanes or other embellishments could be added to increase the generator's profile and make it more sensitive to wind. As the enclosure swings due to wind action, the magnets which it houses move through the interior of the ring to produce an electrical output.

The invention has many other applications involving devices that are hand held, portable or otherwise subject to motion. For example, an electrical generator as described herein could be installed on the axle of an automobile or other vehicle to capture vibrations from the vehicle's movement, and used to generate electrical power for air pressure sensors embedded in the vehicle tires. The pressure information could be transmitted to a driver display to provide a warning of low or high pressure conditions.

Figure 14A:
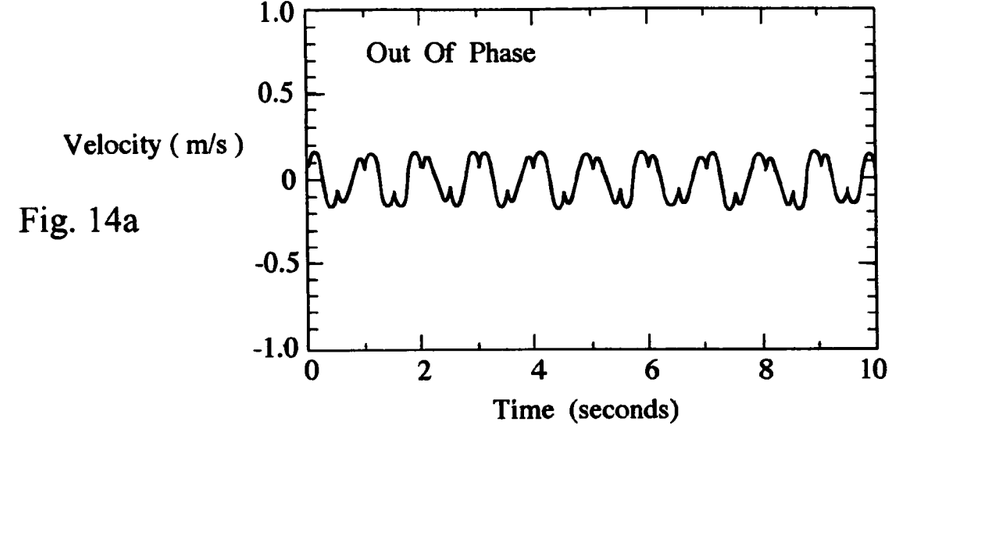
FIGS. 14a and 14b are calculated plots of magnet velocity versus time in a single magnet system for out-of-phase and in-phase actuations, respectively.
Figure 14B:
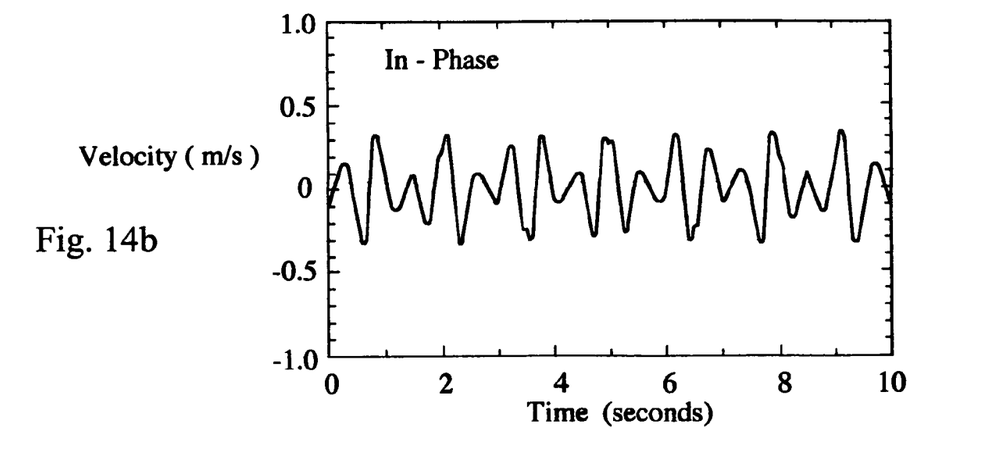

Some of the limitations of a single magnet system are illustrated in FIGS. 14*a* and 14*b*, which illustrate calculated responses of a single magnet system to applied translational forces which are respectively out-of-phase (FIG. 14*a*) and in-phase (FIG. 14*b*) with the system's initial magnet movement. The system is assumed to have a natural or resonant frequency of 1 Hz, referring to the oscillation frequency of the magnet within the enclosure that is induced in response to a single axial movement of the enclosure. For purposes of these calculations, a frictionless system was assumed with an undamped magnet response.

In FIG. 14*a*, the magnet is assumed to be at the center of the enclosure and moving in a direction counter to the impulse applied to the enclosure (out-of-phase), while in FIG. 14*b* the magnet is assumed to initially be centered but moving in the same direction as the applied impulse (in-phase). The plots show the calculated velocity of the magnet as it oscillates back and forth in response to a single applied translation of the enclosure. It can be seen that the peak velocities for the in-phase trial are approximately twice those with the out-of-phase trial, which would produce a correspondingly greater electrical output for the in-phase situation. These calculations illustrate a single mode of oscillation which characterizes a single magnet system. The magnet will have only a single primary oscillation mode, with a markedly reduced response to other inputs. Thus, its effective power generation capability is seriously limited when the system operates in response to random or quasi-random inputs, such as those produced by a walking motion or wave/wind action, or to a periodic input that is out-of-phase with the initial magnet movement.

Figure 15A:
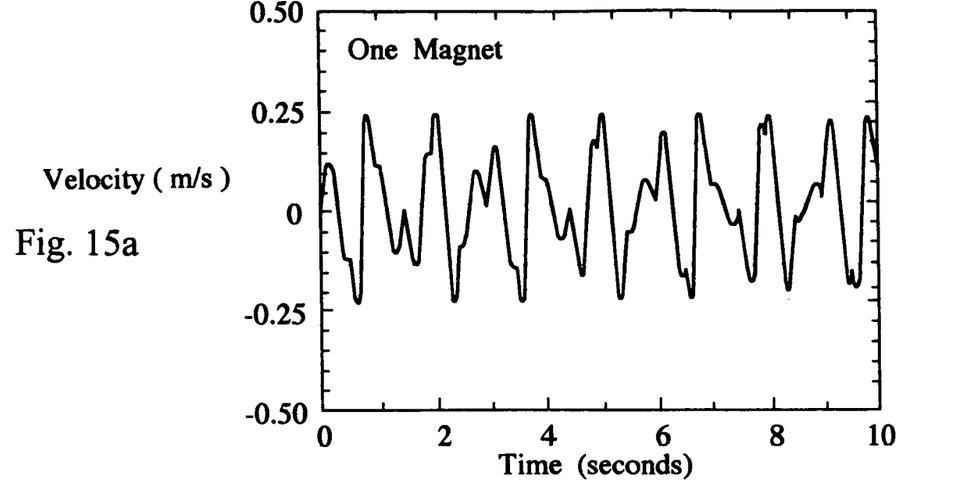
FIGS. 15a and 15b are calculated plots of magnet velocity as a function of time for one and two magnet systems, respectively.
Figure 15B:
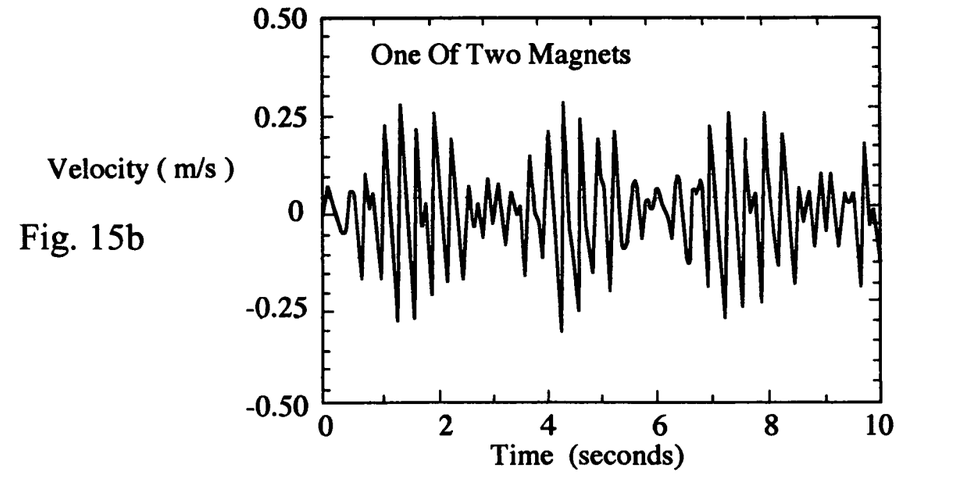

FIGS. 15*a* and 15*b* illustrate the much greater capability of a multi-magnet system to produce a useful output in response to enclosure movements that are not periodic at the natural frequency, or are out-of-phase with the initial magnet movement. FIG. 15*a* illustrates the response of a single magnet system with a 1 Hz natural frequency to an in-phase pulse, again assuming zero friction between the magnet and its enclosure. It can be seen that the magnet oscillates with only one basic natural frequency, and the illustrated response is optimum. A reduced magnet movement results from inputs that are at frequencies other than the single natural frequency, and from out-of-phase inputs.

FIG. 15*b* represents the calculated response for one of two magnets in a dual magnet system such as that shown in FIG. 3 or 8. In contrast to the single magnet system, each magnet in the dual system has numerous modes of operation, as indicated by the several peak velocities during each one second period. These multiple modes of oscillation provide many more vehicles for coupling applied inputs into movement of the magnets. With a varying input, it is considerably more likely that the input at any given time will be at or near one of the multi-magnet system's numerous modes of operation than to the single magnet system's sole oscillation mode. Thus, in the case of an input with a random, quasi-random or sweeping frequency, the input to the multi-magnet system will match one or another oscillation mode several times for each time the single magnet system's oscillation mode is matched. The result is a greatly enhanced coupling of the input force into movement of the magnets.

Figure 16A:
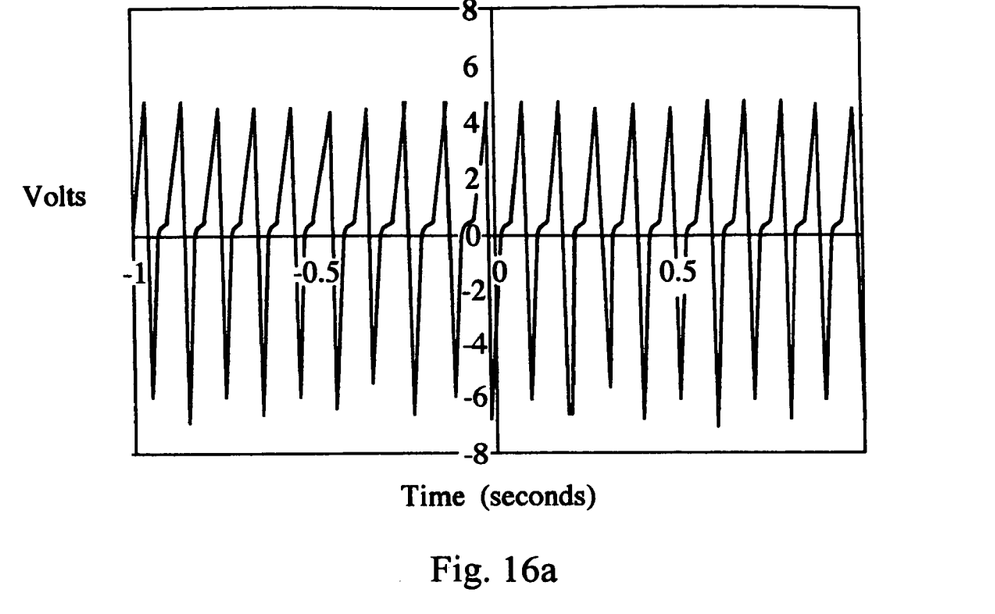
FIGS. 16a and 16b are measured plots of the voltage output produced from one and two magnet systems, respectively.
Figure 16B:
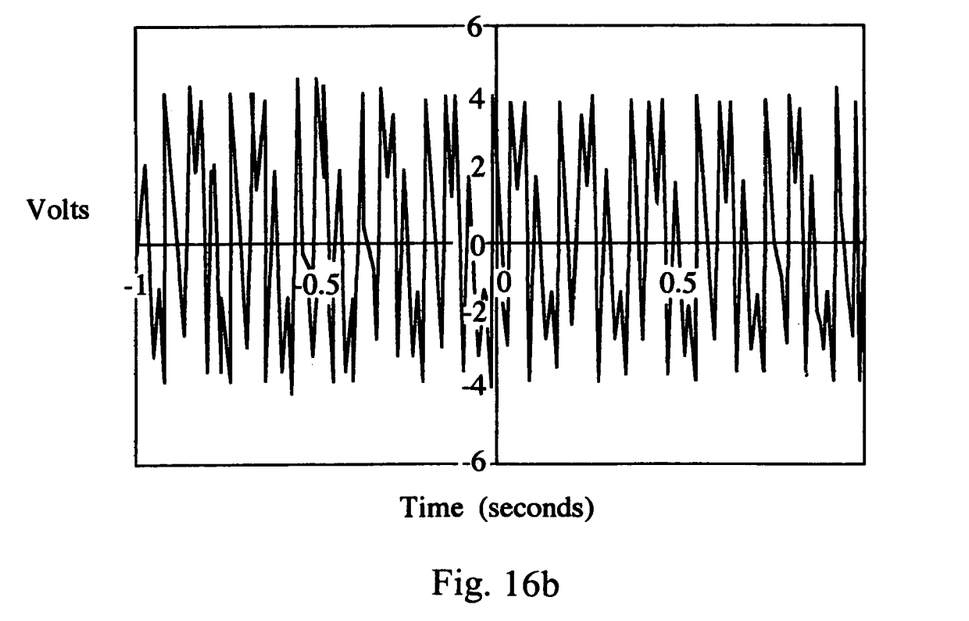

FIGS. 16*a* and 16*b* contrast the measured voltage output of single and dual-magnet systems having a natural frequency of 10 Hz. FIG. 16*a* shows the results when the single magnet system was vibrated back and forth at its 10 Hz resonant frequency. A stack of four magnets with a total thickness of approximately 2.5 cm and a diameter of about 0.95 cm was used with a 2,000 turn coil. The peak voltage output was slightly greater than 4 volts, with a 0.1 second period and a power output of 0.291 watts. Since the vibration applied to the enclosure matched the system's natural frequency, this was a best case situation.

FIG. 16*b* shows the measured results of a dual magnet system with magnets of the same diameter but half the thickness as for FIG. 16*a*, and a single 1,600 turn coil around the center of the enclosure. The peak voltages produced were again slightly greater than 4 volts, but occurred more frequently and produced a power output of 0.335 watts. The power production would have been greater if the 2000 turn coil of FIG. 16*a* had been used for the system of FIG. 16*b*, since the power produced is generally proportional to the number of turns. The power output could have been increased still further with the use of two coils as in FIG. 8, and the increase over the single magnet system's output would have been even greater had the input not been in-phase with the initial magnet movement and at the single magnet's natural frequency.

The invention thus provides a dynamic magnet system that has a strong response to a much greater range of inputs than previous systems, and enables the production of useful amounts of electricity in applications to which previous systems were not adaptable. While particular embodiments of the invention have been shown and described, numerous variations and additional embodiments will occur to those skilled in the art. For example, greater numbers of magnets could be employed than in the systems illustrated, or types of ferrofluids other than the specific compositions described could be used. Also, instead of placing the magnets inside a housing and winding the coils around the outside of the housing, the elements could be reversed with coils inside a housing and a toroidal-shaped magnet outside. Multiple magnets could also be spaced apart from each other but mechanically coupled so that they move together, rather than independently. In this embodiment separate coils corresponding to each different magnet would preferably be provided. Accordingly, it is intended that the invention be limited only in terms of the appended claims.

We claim:

1. An electrical generator, comprising:
a support structure,
a conductor supported relative to said support structure,
a plurality of magnets constrained by said support structure and oriented in polar opposition for movement relative to said conductor over a range, with at least a portion of each magnet's magnetic field intersecting the conductor over at least a portion of said range, said support structure providing an unobstructed magnet movement path between said magnets, said magnets aligned along a common axis in successive polar opposition to each other, at least some of said magnets having different magnetic strengths, and
ferrofluid bearings in the vicinity of the opposite ends of each of said magnets to provide a low friction interface between said magnets and said support structure,
said magnets having multiple oscillation modes relative to said support structure resulting from mutual interaction between said magnets,
said conductor arranged with said magnets so that movement of said magnets over said range generates an electrical signal in said conductor.

2. The electrical generator of claim 1, said conductor comprising a coil on an opposite side of said support structure from said magnets.

3. The electrical generator of claim 1, said ferrofluid bearings causing the magnetic field from each of said magnets to extend on average further away from its magnet than if said magnet were immersed in a ferrofluid, so that a greater portion of each magnet's field intersects said conductor.

4. The electrical generator of claim 1, said support structure including a raceway for said magnets.

5. The electrical generator of claim 1, wherein said support structure is arranged for said magnets to move in response to a generally horizontal movement of the support structure.

6. The electrical generator of claim 1, wherein said support structure is arranged to be carried by a person and for said magnets to move in a reciprocating motion in response to motion of the person.

7. The electrical generator of claim 1, further comprising at least one additional conductor supported relative to said support structure.

8. The electrical generator of claim 1, further comprising a pair of end magnets limiting the travel of said moving magnets, said end magnets oriented in like polarity to the nearest respective moving magnet.

9. The electrical generator of claim 1, said support structure orienting said magnets for movement in a primarily horizontal direction.

10. The electrical generator of claim 1, each of said magnets having an aspect ratio on the order of unity.

11. The electrical generator of claim 1, wherein at least some of said magnets have different sizes.

12. The electrical generator of claim 1, comprising an even number of magnets.

13. The electrical generator of claim 1, further comprising output circuitry for coupling energy out from said conductor.

14. The electrical generator of claim 13, said output circuitry comprising a rectifier.

15. The electrical generator of claim 13, further comprising an operating system coupled to be powered by energy coupled out from said output circuitry.

16. The electrical generator of claim 15, said operating system comprising a battery charger having a battery contact, said output circuitry connected to supply a battery charging signal to said contact.

17. The electrical generator of claim 15, said operating system comprising an environmental sensor powered by said output circuitry and arranged to produce an output signal indicative of an environmental condition.

18. The electrical generator of claim 15, said operating system comprising a transmitter powered by said output circuitry and arranged to transmit a communication signal.

19. The electrical generator of claim 15, said operating system comprising a cellular telephone powered by said output circuitry.

20. The electrical generator of claim 15, said operating system comprising a flashlight powered by said output circuitry.

21. An electrical generator, comprising:
a support structure,
a conductor supported relative to said support structure,
a plurality of magnets constrained by said support structure and oriented along a common axis in successive polar opposition for movement relative to said conductor over a range, with at least a portion of each magnet's magnetic field intersecting the conductor over at least a portion of said range, said support structure providing an unobstructed magnet movement path between said magnets, at least some of said magnets having different magnetic strengths, and
ferrofluid bearings in the vicinity of the opposite ends of each of said magnets to provide a low friction interface between said magnets and said support structure,
said conductor arranged with said magnets so that movement of said magnets over said range generates an electrical signal in said conductor,
said magnets having multiple oscillation modes relative to said support structure resulting from mutual interaction between said magnets.

* * * * *